Sept. 8, 1970   E. ASTROVE   3,528,009
LINE FAULT INDICATOR USING MOIRE PATTERNS
Filed July 5, 1968

INVENTOR
EDGAR ASTROVE

BY David N. Koffsky
ATTORNEY

United States Patent Office 3,528,009
Patented Sept. 8, 1970

3,528,009
LINE FAULT INDICATOR USING MOIRE PATTERNS
Edgar Astrove, Scarsdale, N.Y., assignor to Ferdinand Frankel, doing business as Frankel Connector Company, New York, N.Y.
Filed July 5, 1968, Ser. No. 742,718
Int. Cl. G01r *19/16, 31/02;* G08b *5/20*
U.S. Cl. 324—133                                9 Claims

ABSTRACT OF THE DISCLOSURE

A line fault indicator is constructed with an indicating system which includes a magnetic armature with geometric line patterns on its two major surfaces. The armature is constrained between two transparent windows, each of which has a line pattern and a permanent magnet integral therewith. A U-shaped soft iron core is provided to couple the electric field from the conducting being sensed to the indicating system. In one configuration, the indicating system is initially set so that the magnetic armature is attracted and held against one of the transparent windows by the permanent magnet associated with the respective window, thereby creating a moire pattern which is visible through the transparent window. When an overcurrent line fault occurs, an increased field strength appears in the iron core and is coupled through the magnetic armature. The resulting magnetic attraction is sufficiently strong to overcome the holding magnet's attraction upon the armature, and draws it into engagement with the other transparent window where it is captured and held by the magnet associated with that window. This destroys the visible moire pattern through the first window and is indicative of the occurrence of an electrical fault.

---

This invention relates to indicators and more particularly to line fault indicators adapted to show the occurrence of an electrical overcurrent condition, recording the condition occurrence even if the condition is no longer present.

As electrical distribution systems become increasingly inaccessible, fault location and repair reach new heights of difficulty. Underground distribution systems are becoming the norm rather than the exception with electrical lines being placed not only below ground, but also below water. In these relatively hostile environments, electrical lines must be kept operational and when a fault occurs, it must be found and repaired with dispatch. Fault indicators provide the repairman with indispensible information which helps him locate the fault.

While the art is replete with many types of fault indicators, they are generally expensive and involve mechanically movable parts which are subject to corrosion and jamming. Many such indicators are not suitable for exposed operation and few can be utilized in an underwater environment without expensive casing arrangements.

Of the many types of electrical fault indicators in present use, the relay and motor types are most common. The relay type employs an armature which is held away from a magnetic core by spring tension. When an overcurrent occurs, the armature is drawn down upon the magnetic core and either makes auxiliary electrical contacts to signal the fault, or activates a mechanical flag or some other mechanical indication of fault. The motor type is provided with a pivotally mounted armature which is aligned between a pair of pole pieces. The occurrence of an overcurrent acts to align and latch up the armature between an auxiliary pair of pole pieces. The fault indication is provided through a window which allows the armature to be seen only when it is aligned with the auxiliary poles.

Both of the above types of fault indicators have serious deficiencies. They are relatively expensive to manufacture and calibrate. Both employ a number of moving parts which are subject to corrosion and friction. Neither is capable of operating in an underwater environment without special housing provisions.

Accordingly, it is an object of this invention to provide an improved line fault indicator.

It is a further object of this invention to provide a line fault indicator of inexpensive and simple design.

Another object of this invention is to provide a line fault indicator which is easily resettable.

Another object of this invention is to provide a line fault indicator which is easily calibrated.

Still another object of this invention is to provide a line fault indicator which is capable of operating in hostile environments.

And yet another object of this invention is to provide a line fault indicator which is capable of either on-site or remote operation.

The foregoing and other objects, features and advantages of the invention will be apparent from the following more particular description of the preferred embodiment of the invention, as illustrated in the acompanying drawings.

Figure 1A:
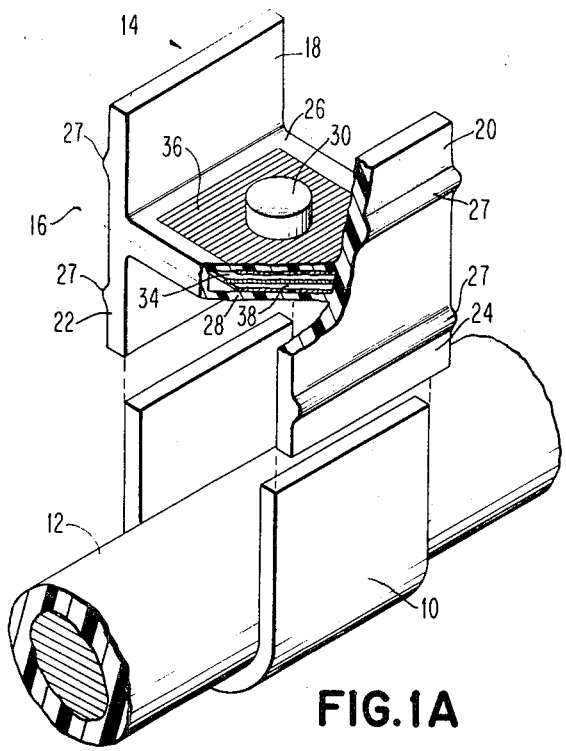
FIG. 1A is a partially exploded and sectioned isometric view of a preferred embodiment of the invention.
Figure 1B:
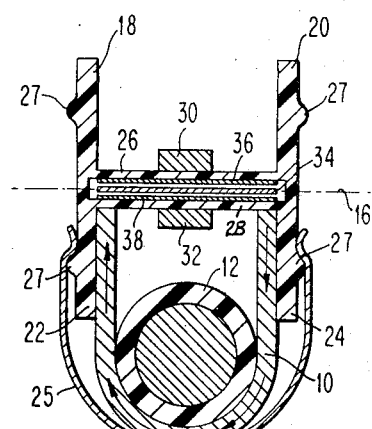
FIG. 1B is a sectioned view taken along line AA in FIG. 1 when the invention is fully assembled.

Referring now to FIGS. 1A and 1B, a U-shaped soft iron core 10 fits around insulated conductor 12 and is used as a transducer to couple electromagnetic flux changes to line fault indicating assembly 14. The combination of iron core 10 and conductor 12 create a one-turn electromagnetic which is instrumental in the operation of this invention. H-housing 14 is symmetrical about center line 16 and includes leg members 18, 20, 22 and 24. The legs of U-shaped core 10 are adapted to nest between either of leg pairs 18 and 20 or 22 and 24, with the combination being held together via the inter-cooperation of leaf spring 25 and protrusions 27 provided on each of legs 18, 20, 22 and 24.

Intermediately disposed between the legs 18, 20, 22 and 24 are a pair of transparent windows 26 and 28, each of which has a magnet, 30 and 32, respectively, centrally positioned thereon. Movably disposed between windows 26 and 28 is an armature 34 which is preferably fabricated as a flake of a thin sheet steel or other magnetic metal. Both major surfaces of armature 34 are provided with a geometric line pattern as are also transparent windows 26 and 28. The line patterns may be created by etching, molding, machining, via the application of lined, transparent decals, or other suitable method. In FIGS. 1A and 1B, the line patterns on transparent windows 26 and 28 are provided by decals 36 and 38, respectively, while the line patterns on both major surfaces or armature 34 are provided by decals 40 (shown in FIG. 2B).

The pattern on each transparent window is comprised of closely spaced parallel opaque lines with intermediate transparent spaces. A like pattern is provided upon both major surfaces of armature 34. However, the lines in the armature pattern are offset by a slight angle of rotation to the lines appearing in the patterns on transparent windows 26 and 28. When such a line pattern, as is provided on either the windows or the armature, is viewed from a short distance, the opaque lines and spaces merge into a uniform gray appearance. However, when one of the transparent window line patterns is superimposed upon the pattern appearing on the armature 34, the opaque lines of each pattern intersect due to their differing angles, and at each intersection there is generated an interference line. The interference lines are wider than the interfering opaque lines and the distinct pattern which they create is known as a moire pattern. An examination of this phenomenon discloses the fact that the interference lines are caused by the opaque lines of one pattern covering the transparent spaces of the other pattern. The more acute the angle of intersection between the lines, the broader are the auxiliary or moire lines. The phenomenon of the moire pattern is used in this invention to provide the desired indication of the state of the overcurrent indicator. Of course, many geometric patterns will create unique moire patterns and the invention is not to be limited by the specific character of this description.

Figure 2A:
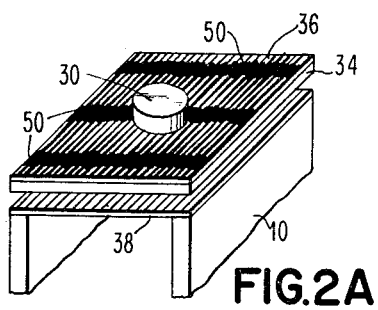
FIGS. 2A and 2B are schematic views of the indicating system which aid in an understanding of the invention.
Figure 2B:
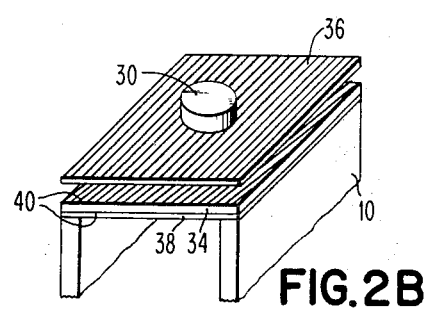

Referring now to FIGS. 2A and 2B, a schematic version of the invention is shown which will aid in an understanding of its operation. In its reset condition, a steady state current flows in conductor 12 and creates a nominal magnetic flux density in core 10 which is coupled from pole piece to pole piece through armature 34. This phenomenon creates a magnetic attraction which tends to pull armature 34 towards the pole pieces. However, armature 34 is firmly held against upper line decal 36 by magnet 30, and the magnetic attraction from core 10 is insufficient to overcome the pull of magnet 30. As above described, line pattern 40 on armature 34 interacts optically with the line pattern on decal 36 to create moire pattern 50. Pattern 50 is visible from a relatively long distance and clearly indicates the presence of an acceptable or in-tolerance condition in conductor 12.

If the current level in conductor 12 experiences an unexpected rise above a predetermined level due to a short circuit or other transient effect, the flux density in iron core 10 increases by an amount proportional to the current rise. The resulting increased flux density, in effect, strengthens the magnetic pull exerted by iron core 10 upon armature 34 and overcomes the attractive power of magnet 30. Armature 34 is thereby drawn downwardly into contact with transparent window 28 and line decal 38 where it is captured and held by magnetic 32 (not shown). As soon as armature 34 moves away from decal 36, the moire pattern disappears and is replaced by the aforementioned grayish surface appearance which is indicative of the occurrence of an overcurrent condition (see FIG. 2B). As described above, the grayish surface is merely an illusion created by the human eye being unable to distinguish between the closely spaced opaque lines and intermediate transparent areas.

In order to reset the line fault indicator leaf spring 22 is removed and the indicating assembly is inverted. In other words, legs 18 and 20 are now caused to encompass iron core 10, and armature 34 is held away from the pole pieces by magnet 32. A moire pattern is again visible through transparent window 28 due to the interaction between the transparent window and armature line patterns, and the indicator is ready for its next operation. Reset may also be accomplished by bringing a strong magnet into proximity to transparent window 26 (and associated decal 36) to attract armature 34 away from magnet 32 and back into association with magnet 30. In this case reversal of the indicating assembly is necessary.

Figure 3A:
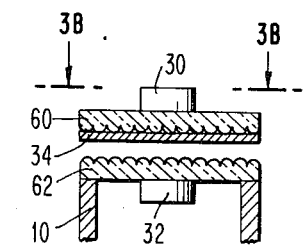
FIGS. 3A–3D are schematic views of an alternative indicating system.
Figure 3B:
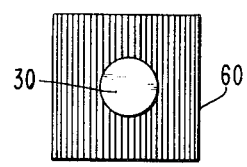
Figure 3C:
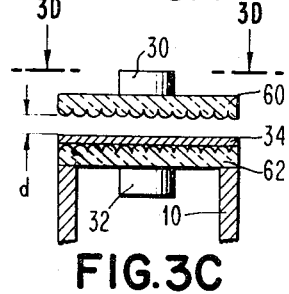
Figure 3D:
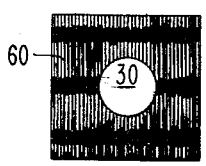

Turning now to FIGS. 3A–3D, a modification to the invention is shown wherein line decals 36 and 38 of FIGS. 1–2B are replaced with optical gratings or lenticular lenses 60 and 62. The line patterns created by gratings 60 and 62 are oriented at a slight angle with respect to the line patterns upon armature 34 (in the same matter and for the same purpose as were the patterns of FIGS. 1–2B). In this instance, however, when armature 34 is held against grating 60 by magnet 30, the optical character of grating 60 blurs or defocuses the line pattern on armature 34 and creates the aforementioned grayish surface effect upon the upper surface of the grating (FIG. 3B).

When armature 34 is pulled downwardly against grating 62—indicating an overcurrent situation (FIG. 3C), the moire pattern appears on the surface of grating 60 (FIG. 3D) providing the desired indication of the occurrence of an overcurrent. The appearance of the moire pattern in the actuated position occurs as a result of the visible surface of armature 34 residing a distance "d" from optical grating 60, which distance "d" is constructed to be the focal length of the grating. The line pattern on armature 34 is thus focussed by the lenses of grating 60 upon the upper surface of the grating. Hence, the focussed line pattern interacts with the line pattern of grating 60 and produces the desired moire pattern.

Figure 4:
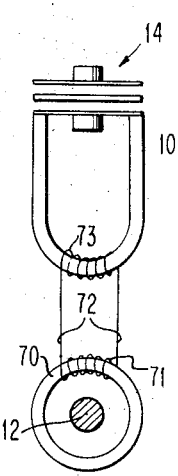
FIG. 4 is a schematic diagram showing remote operation of the indicating system.

Turning now to FIG. 4, remote operation of the line fault indicator is shown. In this case, conductor 12 threads through auxiliary core 70, which is provided with secondary winding 71. Secondary winding 71 is connected via conductors 72 to winding 73 which serves as the primary winding for core 10. The operation of the invention is identical to that shown in the preceding figures, except that winding 73 is employed where remote indications of faults are required.

The line fault indicator may be constructed of any number of materials, however, a molded plastic housing has been found quite adequate. In order to calibrate the indicator, it is only necessary to simulate the desired level of overcurrent detection and then to place shims under magnets 30 and 32 to decrease their magnetic pull upon armature 34 until the magnetic pull of core 10 always predominates. Likewise, shims can be placed on the ends of the pole pieces of core 10 to lessen its magnetic pull should this be desirable.

While the invention has been particularly shown and described with reference to the preferred embodiments thereof, it will be understood by those skilled in the art that the foregoing and other changes in form and details may be made therein without departing from the spirit and scope of the invention.

What is claimed is:
1. An indicator comprising:
   (a) armature means having a first area of geometric pattern;
   (b) armature housing means having a central armature locating cavity including a window having a second area of geometric pattern viewable through the window, the housing having a number of internal and external reference surfaces, the relationships of said armature means and the internal reference surfaces being such as to permit limited easy translational movement of said armature means to at least first and second positions of stability, said armature in the first position of stability being latched in position proximate to said window to provide a juxtaposition of said first area of geometric pattern, said second area of geometric pattern, and said window, whereby a moire pattern is viewable through said window, and said armature in the second position of stability being positioned remote from said window to provide a different juxtaposition of said first area of geometric pattern, said second area of geometric pattern and said window, whereby a diffused pattern is viewable through the window; and
   (c) transducer means external to said armature housing means (b) to move armature means (a) in response to an electrical transient.
2. A line fault indicator according to claim 1 wherein the internal reference surfaces of said armature housing means (b) include permanent magnets juxtaposed with respect to said armature means (a) so as to latch said armature means (a) in each of said first and second positions of stability respectively when said armature means (a) is driven to such position of stability as a re- sult of overpowering magnetomotive force applied to said armature means (a) by said transducer means (c).

3. A line fault indicator according to claim 2, wherein:
said armature means (a) is a free floating flake of ferromagnetic material with a geometric pattern arrayed on each of its two major surfaces;
said armature housing means (b) has two windows on opposed sides of its central cavity, each window having a geometric pattern;
whereby the armature means by being shifted translationally from proximity to a first window to proximity to a second window provides a permanently latched moire pattern at the second window indicating the occurrence of a transitory evet impressed on said armature means as a magnetomotive force by said transducer means (c).

4. A line fault indicator according to claim 3, wherein:
said transducer means (c) is an electromagnetic yoke of configuration adapted to permit placement over an electric power line in which fault location is desired, and dimensioned complementary to external surfaces on said armature housing means (b) so that when assembled with an enclosed electric line the electric current in the line produces a current-related magnetomotive force affecting said armature means (a).

5. A line fault indicator according to claim 3, wherein:
the window portions of said armature housing means (b) are provided with a plurality of lenticular lenses, whereby the lenticular lenses provide both optical magnification and the geometric pattern necessary to form moire patterns with the patterns of said armature means (a).

6. A line fault indicator according to claim 4, wherein:
said housing means (b) has external reference surfaces associated with each of the two positions of stability of said armature means (a); and
said transducer means (c) is equipped with related reference surfaces so that said transducer means (c) can be assembled into operative relationship with said housing (b) and its included armature means (a) as a reversible indicating assembly;
whereby the fault indicator can be reset by inverting the indicating assembly without removing the transducer means (c) from an operating location on a current carrying electric line.

7. A line fault indicator according to claim 4, wherein:
said transducer means (c) includes—
an electromagnetic collar adapted for placement over an electric line in which fault location is desired,
an electromagnetic yoke dimensioned complementary to external surfaces on said armature housing means (b) so that when assembled and affected by an electric current passing through its enclosed space produces a current-related magnetomotive force, and
secondary winding means having turns about said electromagnetic collar and said electromagnetic yoke,
whereby the indicating assembly of the line fault locator may be positioned remote from the electric line in which fault location is desired.

8. A line fault indicator comprising a transparent plastic housing enclosing a free floating flake armature, the housing and armature being arrayed with complementary composite moire pattern producing geometric patterns, the pattern on said housing including lenticular lenses with the optical and physical boundaries of said lenses providing the geometric patterns, two permanent magnets selected and positioned on opposite sides of said housing to provide latching magnetomotive force to said armature in each of first and second positions of stability, the fluid gap between magnets being such that the near magnet holds the armature firmly in place until driven to the far magnet by an externally applied magnetomotive force, all operative motion of said armature being translational in directions perpendicular to its major surfaces, the housing with enclosed armature being sealed in a fluid medium within said housing in a unitary indicating assembly having dimensional symmetry in the direction of operative motion of said armature, to display a moire pattern when viewed from the top while in the first stable position and when viewed from the bottom while in the second stable position, and conversely, and an electromagnetic yoke dimensioned for assembly with the indicating assembly top or bottom selectively, whereby the indicator is effectively reset by inversion of the indicating assembly with respect to the electromagnetic yoke; and whereby the indicating assembly is actually resettable by the momentary presence of an auxiliary magnetic field producing device in proximity to said near magnet and of opposite polarity and strength sufficient to overcome the attraction of the near magnet to permit translational movement of said armature to the far magnet.

9. An indicating assembly for a transitory electrical event, comprising:
a free floating flake armature having a geometric pattern on at least one major surface;
a plastic housing having a central armature locating cavity dimensioned to provide clearance for said armature to permit free translational movement perpendicular to the major surfaces of said armature for a limited travel between opposing reference surfaces internal to said cavity, the housing having window areas corresponding generally in area and location to the geometric patterns on said armature, and having pattern lenses integral with its surfaces at such window areas to provide with the geometric patterns on said armature a moire pattern when the armature is positioned proximate the window area being viewed and a diffused pattern when the armature is more distant;
a latching magnet mounted on said housing in the window area corresponding in location to the said at least one major surface of said armature to provide latching magnetomotive force to said armature to hold said armature in a stable position proximate said latching magnet and its respective window area of said housing; and
a set of reference surfaces external to said housing for providing mechanical positioning and magnetic coupling of an electromagnetic transducer external said housing with respect to said armature internal to said housing.

References Cited
UNITED STATES PATENTS

| | | | |
|---|---|---|---|
| 1,800,044 | 4/1931 | Baird | 356—169 XR |
| 1,942,052 | 1/1934 | Foust et al. | 324—103 |
| 2,367,299 | 1/1945 | McLarn et al. | |
| 3,145,250 | 8/1964 | Vargady | 356—169 |
| 3,166,635 | 1/1965 | Todt. | |
| 3,266,033 | 8/1966 | Frohbach | 340—373 XR |
| 3,406,388 | 10/1968 | Pihl | 340—381 XR |
| 3,413,548 | 11/1968 | Schweitzer | 324—133 |

GERARD R. STRECKER, Primary Examiner

U.S. Cl. X.R.

324—51; 340—373; 356—169